United States Patent [19]

Nolf, Jean M. E.

[11] Patent Number: 4,799,689
[45] Date of Patent: Jan. 24, 1989

[54] WALL FEEDTHROUGH

[75] Inventor: Nolf, Jean M. E., Hamme-Mille, Belgium

[73] Assignee: Raychem Corporation, Menlo Park, Calif.

[21] Appl. No.: 37,744

[22] Filed: Apr. 13, 1987

[30] Foreign Application Priority Data

Apr. 15, 1986 [GB] United Kingdom ............... 8609089

[51] Int. Cl.⁴ ..................... F16J 9/02; F16L 3/04; F16L 5/02
[52] U.S. Cl. ........................... 227/9; 285/162; 285/915
[58] Field of Search ............. 277/1, 9, 9.5, 10, 11, 277/237 R, 237 A; 285/915, 162, 196, 222

[56] References Cited

U.S. PATENT DOCUMENTS

| 3,663,026 | 5/1972 | Mincuzzi | 277/237 |
| 4,114,898 | 9/1978 | Bainard et al. | 277/9 |
| 4,426,086 | 1/1984 | Fournie et al. | 277/1 |
| 4,643,436 | 2/1987 | Jackowski | 277/1 |

FOREIGN PATENT DOCUMENTS

| 0179657 | 4/1986 | European Pat. Off. |
| 0629338 | 4/1936 | Fed. Rep. of Germany . |
| 3213414 | 10/1983 | Fed. Rep. of Germany . |
| 1245119 | 9/1971 | United Kingdom . |
| 1526123 | 9/1978 | United Kingdom . |

Primary Examiner—Stuart S. Levy
Assistant Examiner—Lynn M. Sohacki
Attorney, Agent, or Firm—A. Stephen Zavell; Herbert G. Burkard

[57] ABSTRACT

A duct seal for sealing a duct (4) to a substrate (20) such as a feedthrough comprises a sealing member (6), a biasing member (8), such as a wrapped spring sheet and an insert (12) positioned between the substrate (20) and the sealing member (6). The biasing member (8) can be operated, through the insert (12) from the outside of the duct. When the substrate is a feedthrough (20), for example, it is advantageous that the biasing member (8) is operated through the insert rather than through the feedthrough (20) itself, since it allows the feedthrough to be temporarily sealed against contaminants.

6 Claims, 2 Drawing Sheets

WALL FEEDTHROUGH

DESCRIPTION

This invention relates to the sealing of a space between a substrate and a duct through which it passes.

One application where a seal is desirable between a duct and a substrate is where the duct is a hole in a wall or other bulkhead, and the substrate is a feedthrough. A "feedthrough" is a term well known in the art. It typically describes a hollow member which is preinstalled in a hole in the wall or bulkhead to provide a passage for later installation of cables or supply-lines through the wall.

Another application where a seal is required between a duct and a substrate is where the duct is a conduit and the substrate is a cable or supply-line passing through the conduit. In this case the seal between the duct and the substrate is known as a "duct seal".

The reason for the seal in both the above applications is to prevent water, dirt or other contaminants ingress, and heat egress. The present invention is, however, primarily concerned with seals involving feedthrough devices.

A highly successful feedthrough is disclosed and claimed in GB No. 1245119 (Raychem Corporation). There, a central portion of a tubular conduit member is sealed within a hole in a wall, such that end parts of the conduit member project from respective sides of the wall. Each end part of the conduit member being of heat-recoverable material and being capable of shrinking diametrically upon the application of heat alone, and optionally being provided with an inner coating of an adhesive. The central portion is fabricated such that shrinkage thereof does not occur when the end parts are heated to cause their recovery. For example, the central part may be produced by shrinking a tube over a reinforcing member having a helically ribbed surface. Where the conduit member is to be sealed through a wall that has already been built, it will preferably be provided on its outer surface with an adhesive, and mortar or concrete or similar substance is packed around the conduit member to seal it in the hole in the wall. After it is sealed in the wall, a cable for example is passed through it and its end parts are heated to cause them to shrink down into engagement with the cable, thereby forming a seal.

Whilst this design can produce excellent results and has been widely used, some difficulties can arise under particularly unfavourable conditions in ensuring a seal between the central portion and the wall. In this respect, reference should be made to copending British Patent Application No. 8427046 filed Oct. 25, 1984 equivalent to published European patent application No. 0179657, which describes a device for enhancing the seal between a feedthrough device and the hole in which it lies.

In that earlier case, we had discovered a device and method which provide an improved seal formed between a duct and a substrate. The device and method use a sealing member which can be sealed to the substrate and the duct, and a biasing member which is arranged to bias the sealing member into engagement with the duct. In one embodiment, the biasing member can be operated after the sealing member has been installed in the duct. Furthermore, the resilient member can be operated externally of the substrate.

The present invention provides a device for forming a seal between a duct and a substrate carried by the duct, comprising:
- a sealing member that can provide a seal between the duct and the substrate;
- a biasing member that can be operated after positioning of the sealing member in the duct to provide a biased engagement between the sealing member and the duct; and
- an insert which can be positioned between the substrate in the duct and the sealing member, through which insert the resilient member can be operated externally of the substrate.

The present invention also provides a method of providing a seal between a duct and a substrate carried by the duct, comprising:
- positioning a sealing member containing a biasing member around the substrate and within the duct; and
- operating the biasing member externally of the duct, and also externally of the substrate to cause it to be biased to engage the sealing member with the duct.

The biasing member in the device and method according to the invention is preferably a resilient member.

One advantage of the invention is that the biasing member is operated externally of the substrate. Thus for example where the substrate is a feedthrough device, the biasing member is operated outside the feedthrough. In many cases a feedthrough is installed in a wall with its end(s) sealed, for example by a heat shrinkable polymeric end-cap. This would be the case where, for example cables and supply-lines are not to be installed in the feedthrough until a later date. The present invention allows the feedthrough to be installed without breaking the end-seal of the feedthrough. Thus the possibility of contamination of the opened feedthrough and/or the necessity to reseal the feedthrough is avoided.

The device according to the invention comprises an insert member which can be positioned between the substrate in the duct and the sealing member. The biasing member is operated through the insert, and therbefore externally of the substrate. Other members may be present between the insert and the sealing member. Indeed in a preferred embodiment the biasing member is positioned between the insert and the sealing member. In a preferred method according to the invention, the method includes the additional step of positioning an insert between the substrate and the sealing member, and activating the biasing member through the insert.

Where an insert is provided, it preferably comprises a passageway in which an actuating member can be positioned to connect the biasing member to the outside of the duct. The biasing member can be operated, by the actuating member from the outside of the duct. After operation of the biasing member the actuating member can be removed and discarded.

Where reference is made to operation of the biasing member what is meant is that the biasing member is caused to change its configuration from its rest configuration to a configuration in which it provides biased engagement between the sealing member and the duct.

Preferably the sealing member comprises a material that can be deformed only when subjected to a certain treatment, for example heating or subjection to a liquid which causes the material to soften. Preferably the sealing member is not deformed immediatly solely by said treatment. Thus, for example, where the treatment is heating, the sealing member may be heated outside the duct (to make it deformable), and then inserted into the duct. At this stage the resilient member is operated to bias engagement between the sealing member and the duct. The sealing member preferably comprises a polymeric material reversibly softenable by heat.

Reference to the sealing member being deformable only when subjected to said treatment is of course to be construed bearing in mind the usual meaning of terms of this art, and the problems solved by this invention. For the avoidance of doubt three points may be made. Firstly, any article is ultimately deformable, and we exclude deformation that would render the article useless. Secondly, the forces that should be considered are those normally encountered in the installation and use of such articles, since ability to install and resistance to displacement during proper use are relevant. Thirdly, the extents of deformation before and after treatment should be considered in relation to the change in configuration required for installation and the change is configuration acceptable after installation. It is believed that the skilled man will have no difficulty in interpreting the requirement regarding deformation.

The device preferably has a first portion that sealingly engages the substrate and a second portion that sealingly engages the duct. The first and/or second portions may seal to the duct and/or substrate by any suitable means. For example each part may be recoverable, be provided with a mechanical fixing means or be provided with an adhesive or sealant, or involve a combination of these sealing techniques. In a preferred arrangement, the resilient member acts to maintain an expanded portion of the duct seal agains the inside of the duct, and another portion of the sealing member is heat-shrunk into engagement with the substrate line. No difficulty will generally be found in applying heat to shrink that other portion of the sealing member around the substrate because that other portion (unlike the portion which engages the duct) will generally protrude from the duct.

On operation of the biasing member, the sealing member is deformed. The deformation typically involves radial expansion of the sealing member. Thus before deformation the sealing member will be easily insertable into the duct, and after deformation it will sealingly engage an internal surface of the duct.

Preferably the surface of the sealing member facing the duct is coated with an adhesive or sealant. Preferably the adhesive or sealant is heat-activatable. Especially preferably the heat-activatable adhesive or sealant is provided, in its unactivated state, having a non-planar, for example indented, surface. Preferably the adhesive or sealant becomes planar when it has been heated to a sufficient temperature for installation. The invention therefore preferably comprises heating the coated sealing member, outside of the duct, until the adhesive or sealant member has become planar, and then inserting the sealing member in the duct.

The biasing member preferably comprises one or more springs that cause or allow a radial expansion of the part of the sealing member that is to engage the duct or other substrate. The biasing member may be made to change from a configuration corresponding to that of the sealing member before installation (for example a portion of a duct seal of smaller diameter) to a configuration corresponding to that of the installed sealing member (for example enlarged diameter). This change may be aided by a treatment, for example heat, but is not brought about immediately solely by that treatment. Thus, the device may be treated (e.g. heated) away from the duct or other place where it is to be installed without the configurational change occuring that would make it difficult or impossible to install. The treatment may advantageously soften the material of the sealing member to allow easy deformation once in position and/or to activate any adhesive or sealant that may be used. The device is therefore preferably first heated, secondly placed in position in the duct, and thirdly the resilient member is operated either to allow or to cause the configurational change.

Where operation of the resilient member allows, rather than causes, the change in configuration, this may result from the sealing member comprising a polymeric material that is dimensionally recoverable, generally expandable, and the resilient member initially acting as a "hold-in".

The biasing member is operated externally of the substrate. Preferably it is operated through an insert, especially preferably by means of an actuating member positioned in a passageway in the insert to connect the biasing member to the outside of the duct. Preferably the actuating member is a mechanical member, for example, a lever, which protrudes, via the insert passage, to the outside of the duct. Another mechanism for operating the biasing member uses an electrical release. In that case the activating member would comprises an electrically conductive member. A third mechanism for operating the biasing member comprises actuation by heat. In this case melting or softening of a fusible or softenable material could allow a resiliently deformed member to relax. In this case the activating member would comprise a thermally conductive member.

The insert used in the present invention is preferably annular. Preferably it comprises a first portion having an external dimension such that it can be inserted within the resilient member, before operation thereof, and a second portion having a larger dimension which projects beyond the edges of the duct. The second portion provides a seal to the edge of the duct. The insert is preferably made form a thermoplastic material having heat deformation resistance, for example, polypropylene, high density polyethylene or nylon.

The device according to the invention may be a made according to any suitable method. For example the parts of the device may be made by extrusion or by moulding for example injection moulding, or by any combination of those methods. Each of the parts may be made separately, or as part of a complex part. For example, the insert member and sealing member may be moulded as a complex part, the insert extending around the biasing member to be contiguous with the sealing member.

Embodiments of the invention will now be described, by way of example, with reference to the accompanying drawings, wherein.

Figure 1:
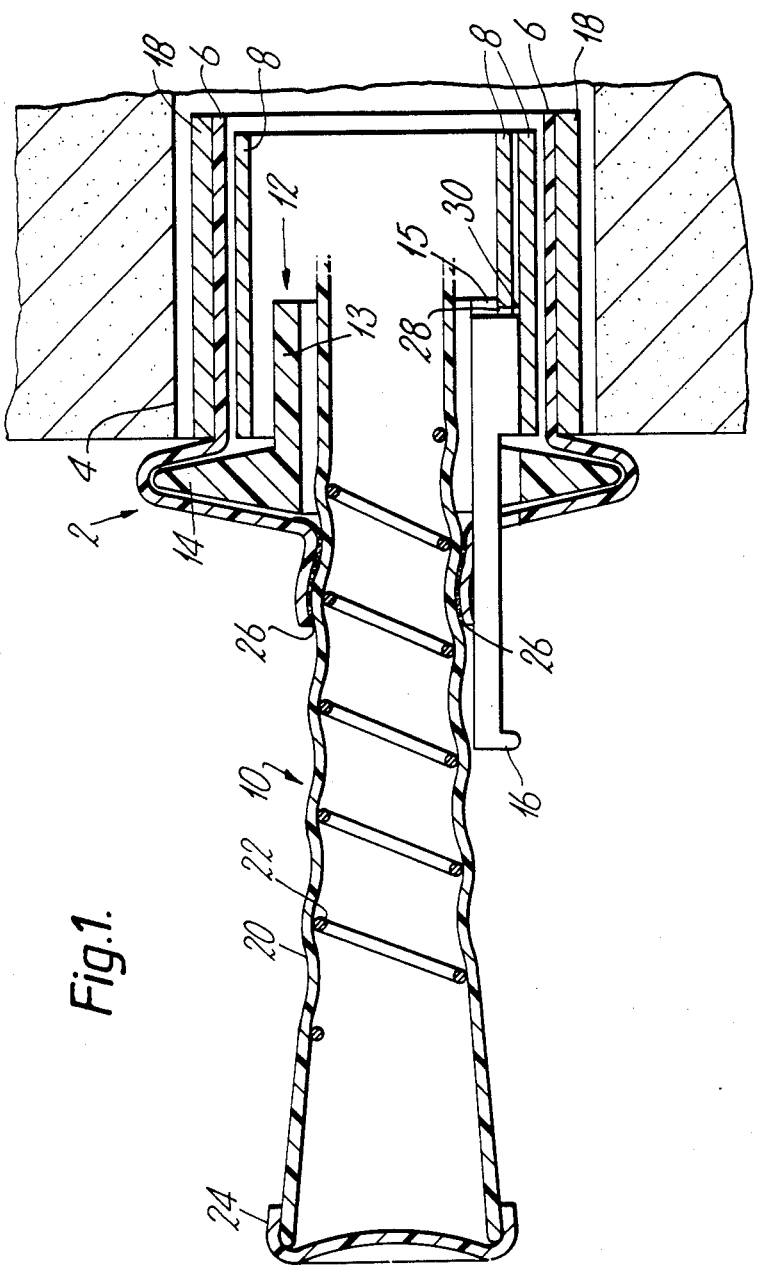
FIG. 1 is a longitudinal section through a device according to the invention, sealing a feedthrough to a hole in a wall, before operation of the biasing member.

Referring to FIG. 1, a device 2 according to the invention is positioned within a duct 4 (in this case a hole in a wall). FIG. 1 shows the device before operation of the biasing member, i.e. before the expansion which causes engagement of the device 2 and the hole in the wall 4.

The device 2 comprises a generally cylindrical, polymeric, heat shrinkable sealing member 6, surrounding a generally cylindrical spring member 8, which is shorter in length than the polymeric sealing member 6 and is substantially coterminous with one end of the sealing member 6. The spring member 8 lies wholly within the duct 4, while the sealing member projects from the duct for attachment to a substrate 10 (in this case a feedthrough device).

An insert 12 is provided. The insert comprises a first cylindrical portion 13, and an annular flange 14 extending radially outward from one end thereof (as in the shape of a hat brim). The cylindrical portion of the insert 12 is positioned within the spring 8 and the flange portion abuts one end of the spring and also against the wall. The flange is larger in dimension than the hole 4 in the wall and therefore seals against it. The sealing member 6 is shaped to overlie the flange of the insert 12.

Figure 2A:
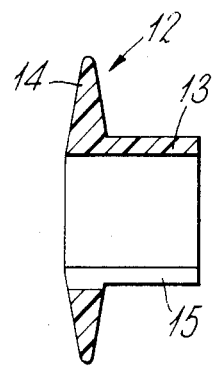
FIGS. 2a and 2b are longitudinal and cross-sectional views through the insert of the device of FIG. 1, FIGS. 3 and 4 are perspective and cross-sectional views respectively, showing operation of a biasing member.
Figure 2B:
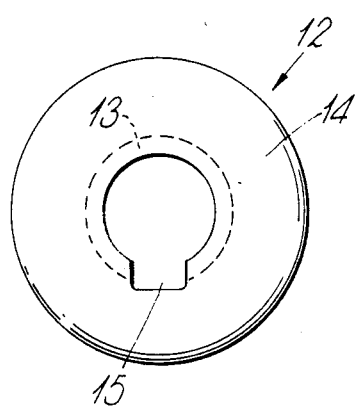

The insert 12 contains a passageway 15 (see FIGS. 2a and 2b). Within the passage way 15 a actuating trigger 16 is positioned.

The outer surface of the sealing member is coated with a sealing material so as to form a seal between the sealing member and the duct. The sealing material may comprise a heat-activatable adhesive or a sealant such as a mastic 18. This has an indented surface before heating (not shown).

The feedthrough 10 is positioned within the device 2. The feedthrough 10 comprises a heat-shrinkable polymeric tubing 20 positioned around a supporting metal spring 22. The end of the feedthrough is sealed by a heat shrinkable cap 24 (which can be removed for later installation of cables or supply-lines).

The internal surface of the sealing member 6 is coated with a hot-melt adhesive 26 at the overlap region with the feedthrough 10.

In order to install the device 2, the device is first heated, outside of the duct, to soften the mastic 18 (until the indents become smooth), then inserted into the duct 4. Then the trigger 16 is actuated to operate the spring 8, causing it to deform the sealing member 6 into resilient engagement with the duct. The trigger 16 is removed. Finally the area of overlap of the feedthrough 10, sealing member 6, and insert 12, is heated to activate the hot melt adhesive and to shrink the sealing member 6 into sealing engagement with the feedthrough 10.

Figure 3:
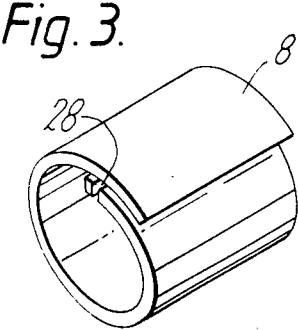
Figure 4:
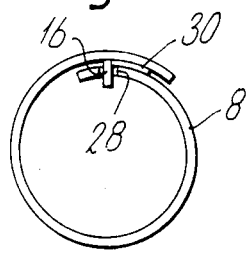

FIGS. 3 and 4 show a spring 8 which can be operated by a trigger such as 16. The spring 8 is in the form of a wrapped sheet of spring metal, the edges of which overlap. The spring may be held in a deformed configuration such as a cylinder of smaller diameter, i.e. of tighter wrap, with a greater of the edges. A release member is provided the spring 8 spring back to its configuration of larger diameter. For example slots 28 may be provided in the underlying edge through which trigger 16 projects temporarily retaining the overlying edge by means of a protrusion 30 thereon. The position of the spring 8 after activation (removal) of the trigger is shown in dotted lines in FIG. 3.

I claim:

1. A device for forming a seal between a duct a substrate carried by the duct, comprising:
    a sealing member that can provide a seal between the duct and the substrate;
    a biasing member that can be operated after positioning of the sealing member in the duct to provide a resiliently biased engagement between the sealing member and the duct; and
    an insert which can be positioned between the substrate in the duct and the sealing member, through which insert the biasing member can be operated externally of the substrate;
    the insert comprising a passageway in which an actuating member can be positioned to connect the biasing member to the outside of the duct, by which actuating member the biasing member can be operated.

2. A device for forming a seal between a duct and a substrate carried by the duct, comprising:
    a sealing member comprising a polymeric material reversibly softenable by heat and that can provide a seal between the duct and the substrate;
    a biasing member that can be operated after positioning of the sealing member in the duct to provide a resiliently biased engagement between the sealing member and the duct; and
    an insert which can be positioned between the substrate in the duct and the sealing member, through which insert the biasing member can be operated externally of the substrate,
    the insert member being annular and comprising a first portion having an external dimension such that is can be positioned within the biasing member and a second portion having an external dimension such that it projects beyond the edges of the duct.

3. A device for forming a seal between a duct and a substrate carried by the duct, comprising:
    a sealing member that can provide a seal between the duct and the substrate,
    a biasing member that can be operated after positioning of the sealing member in the duct to provide a resiliently biased engagement between the sealing member and the duct; and
    the sealing member comprising a first portion that can engage the substrate and a generally cylindrical portion that can be expanded by the biasing member to engage the duct
    an insert which can be positioned between the substrate in the duct and the sealing member, through which insert the biasing member can be operated externally of the substrate,
    the insert member being annular and comprising a first portion having an external dimension such that is can be positioned within the biasing member and a second portion having an external dimension such that it projects beyond the edges of the duct.

4. A device for forming a seal between a duct and a substrate carried by the duct, comprising:
    a sealing member that can provide a seal between the duct and the substrate, the sealing member comprising a heat-shrinkable first portion that can engage the substrate and a generally cylindrical second portion that can be expanded by the biasing member to engage the duct;
    a biasing member that can be operated after positioning of the sealing member in the duct to provide a resiliently biased engagement between the sealing member and the duct; and
    an insert which can be positioned between the substrate in the duct and the sealing member, through which insert the biasing member can be operated externally of the substrate, the insert member being annular and comprising a first portion having an external dimension such that is can be positioned within the biasing member and a second portion having an external dimension such that it projects beyond the edges of the duct.

5. A device for forming a seal between a duct and a substrate carried by the duct, comprising:

a sealing member that can provide a seal between the duct and the substrate;

a biasing member that can be operated after positioning of the sealing member in the duct to provide a resiliently biased engagement between the sealing member and the duct;

an insert which can be positioned between the substrate in the duct and the sealing member, through which insert the biasing member can be operated externally of the substrate; and a sealing material positioned so as to form a seal between the sealing member and the duct, the insert member being annular and comprising a first portion having an external dimension such that can be positioned within the biasing member and a second portion having an external dimension such that it projects beyond the edges of the duct.

6. A device for forming a seal between a duct and a substrate carried by the duct, comprising:

a sealing member that can provide a seal between the duct and the substrate;

a biasing member that can be operated after positioning of the sealing member in the duct to provide a resiliently biased engagement between the sealing member and the duct; and an insert which can be positioned between the substrate in the duct and the sealing member, through which insert the biasing member can be operated externally of the substrate;

the insert being annular and comprising a first portion having an external dimension such that it can be positioned within the biasing member and a second portion having an external dimension such that it projects beyond the edges of the duct.

* * * * *

UNITED STATES PATENT AND TRADEMARK OFFICE
CERTIFICATE OF CORRECTION

PATENT NO. : 4,799,689
DATED : January 24, 1989
INVENTOR(S) : Jean M. E. Nolf

It is certified that error appears in the above-indentified patent and that said Letters Patent is hereby corrected as shown below:

Column 2, lines 42 to 43 replace "therbefore" by--therefore--.
Column 3, line 33 replace "agains" by--against--.
Column 4, line 42 replace "form" by--from--.
Column 5, line 23 replace "a actuating" by--an-actuating--.
Column 5, line 31 replace "2" by--26--.
Column 5, line 38 replace "26" by --2--.
Column 5, line 40 replace "2" by--26--.
Column 5, line 56, after "greater" insert--overlap--.
Column 5, line 57 after "provided" insert--to let--.
Claim 1, line 1 (Column 5, line 65) after "duct" insert--and--.

Signed and Sealed this

Eleventh Day of July, 1995

*Attest:*

BRUCE LEHMAN

*Attesting Officer*         *Commissioner of Patents and Trademarks*

UNITED STATES PATENT AND TRADEMARK OFFICE
CERTIFICATE OF CORRECTION

PATENT NO. : 4,799,689
DATED : January 24, 1989
INVENTOR(S) : Nolf, Jean M.E.

It is certified that error appears in the above-indentified patent and that said Letters Patent is hereby corrected as shown below:

On the cover page: Item [73] Assignee: replace "Raychem Corporation, Menlo Park, CA" by -- NV Raychem SA --.

Signed and Sealed this

Ninth Day of January, 1996

Attest:

BRUCE LEHMAN

Attesting Officer    Commissioner of Patents and Trademarks